(12) United States Patent
Burgess et al.

(10) Patent No.: US 12,125,111 B1
(45) Date of Patent: *Oct. 22, 2024

(54) INTELLIGENT METHODS OF INSPECTION FOR PROPERTY AND CASUALTY INSURANCE CLAIMS

(71) Applicant: United Services Automobile Association (USAA), San Antonio, TX (US)

(72) Inventors: Cleburne Burgess, Fair Oaks Ranch, TX (US); John H. Amstutz, San Antonio, TX (US); Shanna Limas, San Antonio, TX (US); Ramon M. Lopez, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/446,464

(22) Filed: Aug. 8, 2023

Related U.S. Application Data

(63) Continuation of application No. 17/357,548, filed on Jun. 24, 2021, now Pat. No. 11,756,132, which is a continuation of application No. 16/459,456, filed on Jul. 1, 2019, now Pat. No. 11,074,658, which is a continuation of application No. 13/791,132, filed on Mar. 8, 2013, now Pat. No. 10,387,961.

(51) Int. Cl.
*G06Q 40/08* (2012.01)

(52) U.S. Cl.
CPC .................. *G06Q 40/08* (2013.01)

(58) Field of Classification Search
CPC ....................................... G06Q 40/08

USPC ............................................. 705/4
See application file for complete search history.

(56) References Cited

U.S. PATENT DOCUMENTS 4,766,539 A    8/1988    Fox
6,021,397 A    2/2000    Jones et al.
(Continued)

FOREIGN PATENT DOCUMENTS

CA    2429767 A1    6/2004
CA    2604949 A1    10/2006
(Continued)

OTHER PUBLICATIONS

C. A. Henson, J. K. Pschorr, A. P. Sheth and K. Thirunarayan, "SemSOS: Semantic sensor Observation Service," 2009 International Symposium on Collaborative Technologies and Systems, Baltimore, MD, USA, 2009, pp. 44-53. (Year: 2009).*

(Continued)

*Primary Examiner* — Virpi H Kanervo
(74) *Attorney, Agent, or Firm* — Perkins Coie LLP

(57) ABSTRACT

Methods and systems for facilitating loss reporting and resolution are described. In some embodiments, a method includes identifying a bounded geographical area affected by a weather event potentially causing property losses to customers of an insurer. The weather event may have an intensity profile in the bounded geographical area. The method further includes generating a customer density profile in the bounded geographical area and predicting resource utilization based on the customer density profile and the weather event intensity profile in the bounded geographical area.

20 Claims, 9 Drawing Sheets

(56) References Cited

U.S. PATENT DOCUMENTS

| | | | |
|---|---|---|---|
| 7,624,031 B2 * | 11/2009 | Simpson | G06Q 40/08 |
| | | | 705/2 |
| 7,881,945 B2 * | 2/2011 | Schmitt | G06Q 30/016 |
| | | | 705/1.1 |
| 7,949,548 B2 | 5/2011 | Mathai et al. | |
| 7,966,203 B1 | 6/2011 | Pietrzak | |
| 8,229,768 B1 | 7/2012 | Hopkins | |
| 8,229,769 B1 | 7/2012 | Hopkins | |
| 8,280,633 B1 | 10/2012 | Eldering | |
| 8,346,578 B1 | 1/2013 | Hopkins et al. | |
| 8,401,896 B2 | 3/2013 | Wargin | |
| 8,756,085 B1 | 6/2014 | Plummer | |
| 10,387,961 B1 | 8/2019 | Burges et al. | |
| 11,074,658 B1 | 7/2021 | Burges et al. | |
| 2001/0042785 A1 | 11/2001 | Walker et al. | |
| 2002/0147613 A1 | 10/2002 | Kennard et al. | |
| 2003/0040934 A1 | 2/2003 | Skidmore et al. | |
| 2004/0117302 A1 | 6/2004 | Weichert et al. | |
| 2006/0259234 A1 | 11/2006 | Flynn | |
| 2007/0214023 A1 * | 9/2007 | Mathai | G01W 1/00 |
| | | | 705/4 |
| 2008/0133430 A1 | 6/2008 | Horowitz | |
| 2008/0267487 A1 | 10/2008 | Siri | |
| 2009/0138290 A1 | 5/2009 | Holden | |
| 2009/0177500 A1 | 7/2009 | Swahn | |
| 2009/0265193 A1 | 10/2009 | Collins | |
| 2010/0235198 A1 | 9/2010 | Fini et al. | |
| 2010/0238179 A1 | 9/2010 | Kelly | |
| 2011/0218825 A1 | 9/2011 | Hertenstein | |
| 2012/0123806 A1 * | 5/2012 | Schumann, Jr. | G06Q 40/08 |
| | | | 705/4 |
| 2012/0209782 A1 | 8/2012 | Pershing et al. | |
| 2013/0060710 A1 | 3/2013 | Preuss et al. | |
| 2013/0216089 A1 | 8/2013 | Chen et al. | |
| 2013/0226624 A1 * | 8/2013 | Blessman | H04N 7/181 |
| | | | 705/4 |
| 2013/0332205 A1 * | 12/2013 | Friedberg | G06Q 50/02 |
| | | | 705/4 |
| 2014/0257862 A1 * | 9/2014 | Billman | G06Q 50/163 |
| | | | 705/4 |

FOREIGN PATENT DOCUMENTS

| | | | | |
|---|---|---|---|---|
| CN | 102231231 A | 11/2011 | | |
| CN | 202940852 U | 5/2013 | | |
| WO | WO-2007008955 A2 * | 1/2007 | | G01N 1/26 |
| WO | 2009082370 A1 | 7/2009 | | |
| WO | 2014000161 A1 | 1/2014 | | |

OTHER PUBLICATIONS

Peng, Yi, et al. "An incident information management framework based on data integration, data mining, and multi-criteria decision making." Decision Support Systems 51.2 (2011): 316-327. (Year: 2011).*

Fahad et al., "Content and Task-Based View Selection From Multiple Video Streams," Multimedia Tools and Applications, Article 5872291 (Sep. 2009).

Brummond, David J et al., Symposium on Financing Catastrophe Losses in the Property and Casualty Insurance Industry, Journal of Insurance Regulation 12.4: 446, National Association of Insurance Commissioners, 1994.

Zeng, Lixin, "Weather Derivatives and Weather Insurance: Concept, Application, and Analysis," Bulleting of the American Meteorological Society, vol. 81, Issue 9, pp. 2075-2082, Sep. 1, 2000, Year: 2000.

Van Westen, Cees J., "Remote Sensing and GIS for Natural Hazards Assessment and Disaster Risk Management," Faculty of Geo-Information Science and Earth Observation (ITC), University of Twente, Enschede, The Netherlands, Treatise on geomorphology, (Year: 2013).

* cited by examiner

INTELLIGENT METHODS OF INSPECTION FOR PROPERTY AND CASUALTY INSURANCE CLAIMS

CROSS-REFERENCE TO RELATED APPLICATIONS

This application is a continuation of U.S. patent application Ser. No. 17/357,548 filed Jun. 24, 2021, now allowed, which is a continuation of U.S. patent application Ser. No. 16/459,456 filed Jul. 1, 2019, issued as U.S. Pat. No. 11,074,658 on Jul. 27, 2021, which is a continuation of and claims priority to U.S. patent application Ser. No. 13/791,132, entitled "INTELLIGENT METHODS OF INSPECTION FOR PROPERTY AND CASUALTY INSURANCE CLAIMS," filed Mar. 8, 2013, issued as U.S. Pat. No. 10,387,961 on Aug. 20, 2019, all of which are hereby incorporated by reference in their entirety for all purposes.

TECHNICAL FIELD

Various embodiments of the present disclosure generally relate to property losses. More specifically, various embodiments relate to intelligent methods of inspection for property and casualty insurance claims.

BACKGROUND

After a catastrophic weather event, such as a hurricane, hail storm, wildfire, or tornado, property losses may be incurred, especially in heavily populated geographical areas. In the most severe cases, policyholders of such weather events require assistance finding shelter, obtaining basic supplies, beginning the rebuilding process, etc. Other policyholders with less severe damage may not immediately be aware of property losses that they have sustained and may fail to contact the insurance company until several months after the catastrophic event. Insurance companies struggle to quickly identify and notify policyholders who may have sustained losses. It is desirable for insurance companies to quickly respond and assist their customers after such catastrophic events, for several reasons. For example, a quick response can significantly improve a customer's perception of the service provided by the insurance company. Additionally, insurance companies can resolve property and casualty loss claims more efficiently by consolidating resources used during the claims process.

SUMMARY

Methods and systems for inspecting property and casualty insurance claims are described. In some embodiments, a bounded geographical area affected by a weather event potentially causing property losses to customers of an insurer may be identified, with the weather event having an intensity profile in the bounded geographical area. A customer density profile may be generated in the bounded geographical area. The bounded geographical area may then be divided into subsections based on the weather event intensity profile and the customer density profile, and resource utilization may be predicted for each subsection based on estimated property losses in each subsection.

In some embodiments, a severity code may be assigned to each of the subsections indicating an estimated level of severity of the property losses. A level and a type of resources may be recommended based on the predicted resource utilization.

Resources may be allocated to each subsection according to the predicted resource utilization. Predicting resource utilization for each subsection may include estimating customer needs in each subsection based on the customer density level and the weather event intensity profile.

In some embodiments, loss reports are received from one or more of the customers. The resource utilization may be predicted for each subsection based on the loss reports. A weather duration profile may be generated, and the bounded geographical area may be divided based on the weather duration profile.

In some embodiments, loss reports may be opened for select customers prior to receiving loss reports from the select customers based at least in part on locations of insured property of the select customers and the weather intensity profiles. The loss reports may be opened based on loss reports received from other customers.

In some embodiments, images of the insured properties in the geographical area are taken prior to the weather event. After the weather event, the images may be used to verify that reported property losses were caused by the weather event.

In some embodiments, the weather intensity profile is overlaid on a map that indicates insured property locations of the customers. In some embodiments, the method further includes receiving a loss report for an insured property of one of the customers and determining that the loss report is fraudulent based on a location of the insured property and the weather intensity profile. The resources may include insurance adjustors, hotel rooms, roofing contractors, building materials or insurer employees.

In some embodiments, the resources include insurance adjustors, and subsections or portions of subsections are assigned to the insurance adjustors to inspect insured properties in the subsections or the portion of the subsections according to the predicted resource utilization. In some embodiments, the resources are scheduled to proactively assist potentially affected customers with resolving property losses. The resources may be preferred providers of the insurer.

In other embodiments, a system for facilitating claims reporting and resolution includes a database with weather event data associated with a weather event capable of causing loss to customers of an insurance provider in a bounded geographical area and location data of insured property of customers of an insurance provider in the geographical area. The system may further include a weather acquisition module configured to collect the weather event data and generate a weather event intensity profile to indicate the severity of the weather event in the geographical area. The system may also include a customer density profiler configured to generate a customer density profile indicating the location of the insured property of the customers in the geographical area, a subsectioning module configured to create subsections in the geographical area based on the customer density profile and the weather event intensity profile, a resource prediction module configured to predict a set of resources for each subsection, and a resource allocator configured to allocate the resources to each subsection.

In some embodiments, a non-transitory, computer readable medium having computer-readable instructions for programming a computer to facilitate claims reporting and resolution is provided. The instructions may include instructions for performing a method which may include identifying a bounded geographical area affected by a weather event potentially causing property losses to customers of an insurer, the weather event having an intensity profile in the bounded geographical area; estimating property losses based on customer density within the bounded geographical area and the weather event intensity profile; and predicting a set of resources for the bounded geographical area based on the estimated property losses in the bounded geographical area.

While multiple embodiments are disclosed, still other embodiments will become apparent to those skilled in the art from the following detailed description, which shows and describes illustrative embodiments. As will be realized, embodiments of the present disclosure are capable of modifications in various aspects, all without departing from the scope of the present disclosure. Accordingly, the drawings and detailed description are to be regarded as illustrative in nature and not restrictive.

BRIEF DESCRIPTION OF THE DRAWINGS

Embodiments of the present disclosure will be described and explained through the use of the accompanying drawings in which.

Figure 1:
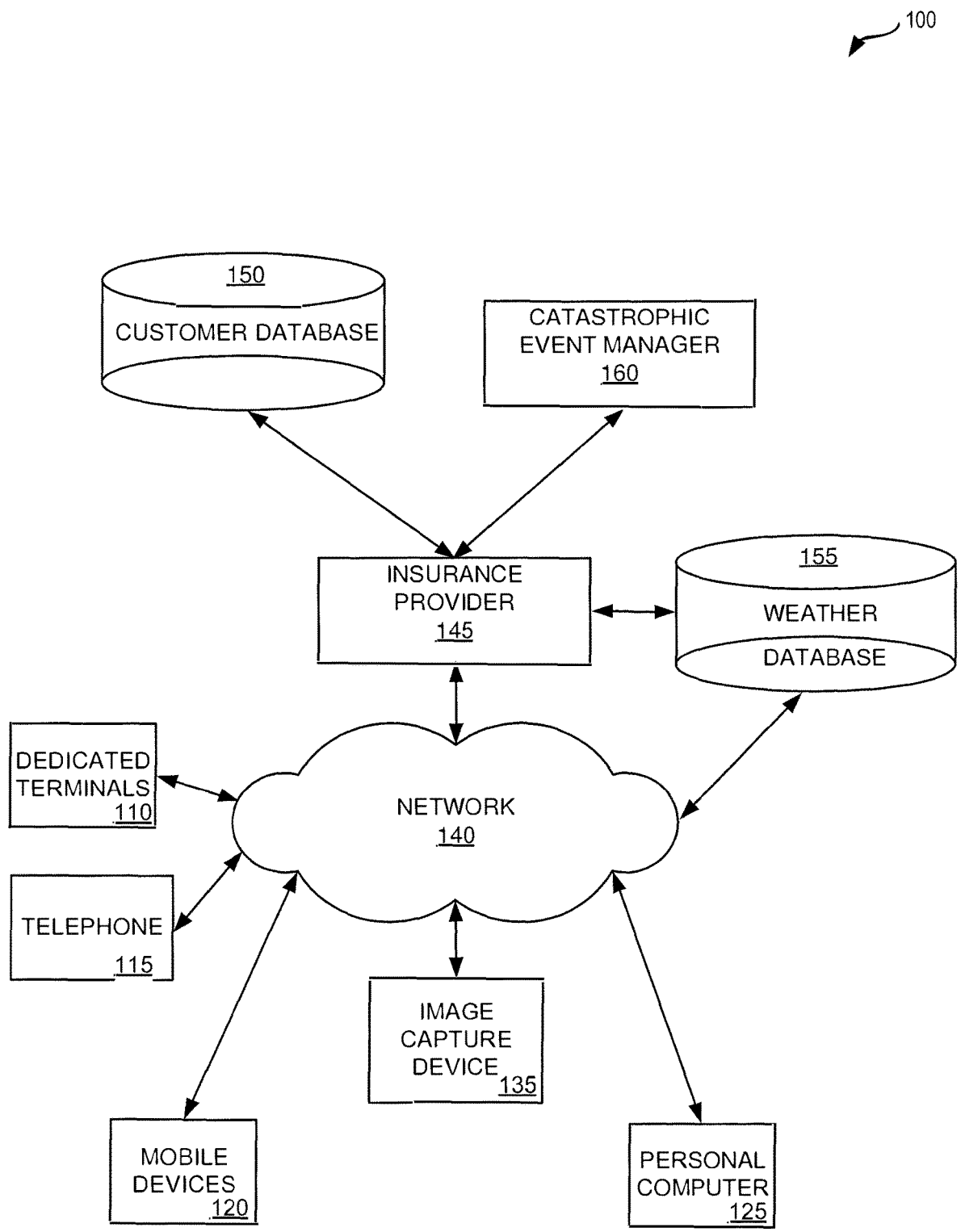
FIG. 1 illustrates an example of an operating environment in which some embodiments of the present disclosure may be utilized.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while embodiments of the present disclosure are amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure.

DETAILED DESCRIPTION

Various embodiments of the present disclosure generally relate to property losses. More specifically, various embodiments relate to intelligent methods of inspection for property and casualty insurance claims.

In accordance with embodiments of the disclosure, an insurance provider has the ability to proactively respond to predictive or actual weather data indicating that losses may be incurred or have been incurred by customers. Customers may be unaware of the damage for several months if, for example, the property is a rental property or the damage is not noticeable, which results in delayed loss report filings. This delayed response may lead to potentially more damage for the insured. Further, the delay results in inefficiencies for the insurance provider. For example, some alleged property damage requires representatives to evaluate the damage. Efficiencies can be gained by having such representative inspect all the insured properties in a predetermined area, or at least those insured properties having damage in the representative's expertise area.

Similarly, efficiencies can be gained by more efficiently allocating contractors who repair the properties, adjusters, and other resources. Costs may be reduced by assigning preferred providers who have pre-negotiated rates to repair the properties in a particular area. Therefore, insurance providers who can predict the resources necessary to service insureds after a weather event will be better positioned to reserve, schedule, and assign resources to particular areas/losses, thereby resolving claims faster and providing a better overall customer experience.

The amount of damage and the type of damage may be estimated based on information regarding the weather event. The information may include various statistics and distributions which can be used in estimating the amount and type of damage. Using this information and the estimates of the amount and type of damage, predictions regarding resources may be made. These resources may include the types of inspectors, building materials, number of employees, contractors, hotels, etc. In some embodiments, predictive and/or actual weather data may be acquired (e.g., in real-time, near real-time, on a periodic schedule, after completion of an event, etc.) and may be analyzed.

The insurance provider can analyze the weather data to create weather profiles and other indications of the severity of the weather to estimate the severity of impending or incurred damage caused by the weather event. Customer locations may also be determined and a customer density profile may be generated using the customer locations. Using the weather data and the customer location data, the severity of the damage can be estimate, and predictions about the amount and type of resources likely to be needed can be made. Depending on the predicted severity and types of damage, the types of inspections can be determined. For example, claims reporting certain losses may require only that the customer send in images of the damage and that the customer fill out a form online. Other types of damage may require an insurance adjustor to physically come to the property to make an assessment.

In some embodiments, a geographic area affected by the weather event can be divided into subsections based on the weather profile and/or the density of customers of an insurance company. The subsections may be assigned a code or other indication of the likely severity of the damage and/or estimation of need of assistance. Resources can be allocated according to an area such as a subsection, neighborhood, street (or other area) based on the predicted need.

In some embodiments, claims may be opened and begun before the customer reports the losses, thus speeding up resolution of losses. For example, roof inspections may be ordered automatically for applicable losses. Customer reports may be used in assessing the claims for later-reporting customers. For example, if a customer reports hail damage and the insurance provider has verified the claim, a customer living on the same street likely experienced similar hail damage as well. Customers who have not reported damage may be notified of these potential losses and informed of times when an insurance adjustor will be available for an inspection. The weather data may be used to investigate fraudulent claims as well. For example, prior to a weather event, images may be taken for comparison after the weather event takes place to verify that the weather event was the cause of any reported damage.

In some embodiments, auditing of damage appraisal, opening and closing of exposures, issuing of Actual Cash Value (ACV) and holdback payments, calculating holdback, and updating reserves based on appraisal amounts may be automated, thus providing additional efficiencies.

In some embodiments, a private collaboration center such as an internet website may be created for all personnel involved in supporting the operations of a specific weather event, both in the field and in the home office. This collaboration center may allow for the sharing of site video, photos, documents, messages, spreadsheets, and other documents used by the insurance provider to process the claims.

In some embodiments, electrical grid data may be used in making property loss assessments. For example, if electrical grid data indicates that the customers did not have power for two days, the insurance provider may assume that the insureds will have claims for food spoilage. In such cases, claims may be automatically paid out without further inspection or documentation.

In the following description, for the purposes of explanation, numerous specific details are set forth in order to provide a thorough understanding of embodiments of the present disclosure. It will be apparent, however, to one skilled in the art that embodiments may be practiced without some of these specific details.

FIG. 1 illustrates an example of an operating environment 100 in which some embodiments of the present disclosure may be utilized. The embodiments of the present disclosure illustrated in FIG. 1 allow user interactions through various points of interaction such as, but not limited to, dedicated terminals 110 (e.g., public terminal or kiosk), telephone 115, mobile devices 120 (e.g., mobile phone), personal computers 125, and image capture devices 135. These points of interaction can include mechanisms for interacting with insurance provider 145 through network 140 and may run one or more applications or clients that allow a user to interact with the network 140 and the insurance provider 145. Such applications may provide access to claims processing systems and interfaces and allow the insurance company to communicate with its customers.

Dedicated terminals 110 such as public terminals/kiosks may be computers available to the public and/or specially designed kiosks that interact with network 140. Telephone 115 may be a landline phone. Mobile devices 120 may be cellular phones, smart phones (a smart phone being a cellular phone that has capabilities and features such as, but not limited to, internet access, a full keyboard, email access, Wi-Fi connection capabilities, BLUETOOTH connectivity, or any other functionality of a computer), tablet computers (a portable computer having a touch interface), netbooks, laptops possibly with a wireless connection (such as an 802.11a/b/g connection or mobile broadband connection, such as via a 3G or 4G wireless network). Personal computers 125 may be any computer (e.g., desktop computers, laptop computers, netbooks, tablet computers, Internet-enabled television devices, etc.) connected to network 140.

Image capture device 135 may be any device that is capable of capturing an image or video of insured property such as, for example, a home, or other items such as a check. Image capture device 135 may be capable of capturing images of damaged property and that can thereafter interact with a computing device for purpose of starting a loss report using the image. The image capture device may be associated with a mobile device 120, a personal computer 125, or other appropriate computing device.

Insurance provider 145 may provide insurance to any number customers. Insurance provider 145 may be a part of a larger organization such as a membership organization in which the customers are members. Insurance provider 145 can use a variety of interaction methods, protocols, and systems to interact with its customers.

As illustrated in FIG. 1, insurance provider 145 can be communicably coupled to a network 140, catastrophic event manager 160, and databases such as weather database 155, and customer database 150. Weather database 155 may include weather information such as weather intensity profiles and weather duration profiles that can be used by the catastrophic event manager 160 in predicting a catastrophic event, estimating property losses and resource needs, and allocating the resources. The weather database 155 may include future weather data (weather predictions) and weather data associated with weather events that already occurred. In addition, weather database 155 may include batch data communications and/or real-time or near real-time feeds of various weather information. In some cases, insurance provider 145 may automatically activate or deactivate the data feeds based on indicators of the severity of the weather event.

Customer database 150 may include information that can be used by the catastrophic event manager 160. For example, customer database 150 may include the name, address, age, annual salary, marital status, location of insured property, value of insured property, claim status, previous claim information, length of membership, membership level, policy information, etc. Catastrophic event manager 160 may use weather information from the weather database 155 and customer information from the customer database 150 to proactively respond to impending or incurred property losses from catastrophic events by acquiring weather data associated with the event, estimating the severity of the losses caused by the event, predicting the amount and type of resources likely needed to address the losses, notifying customers, opening loss reports, sending the appropriate insurance adjustors or inspectors (if needed), ordering supplies, etc.

In some embodiments, the weather database 155 and the customer database can be integrated into one database. A computer system associated with the insurance provider 145 and/or a membership organization within network 140 may be able to access these (and other) databases for customer information, and other stored information.

Figure 2:
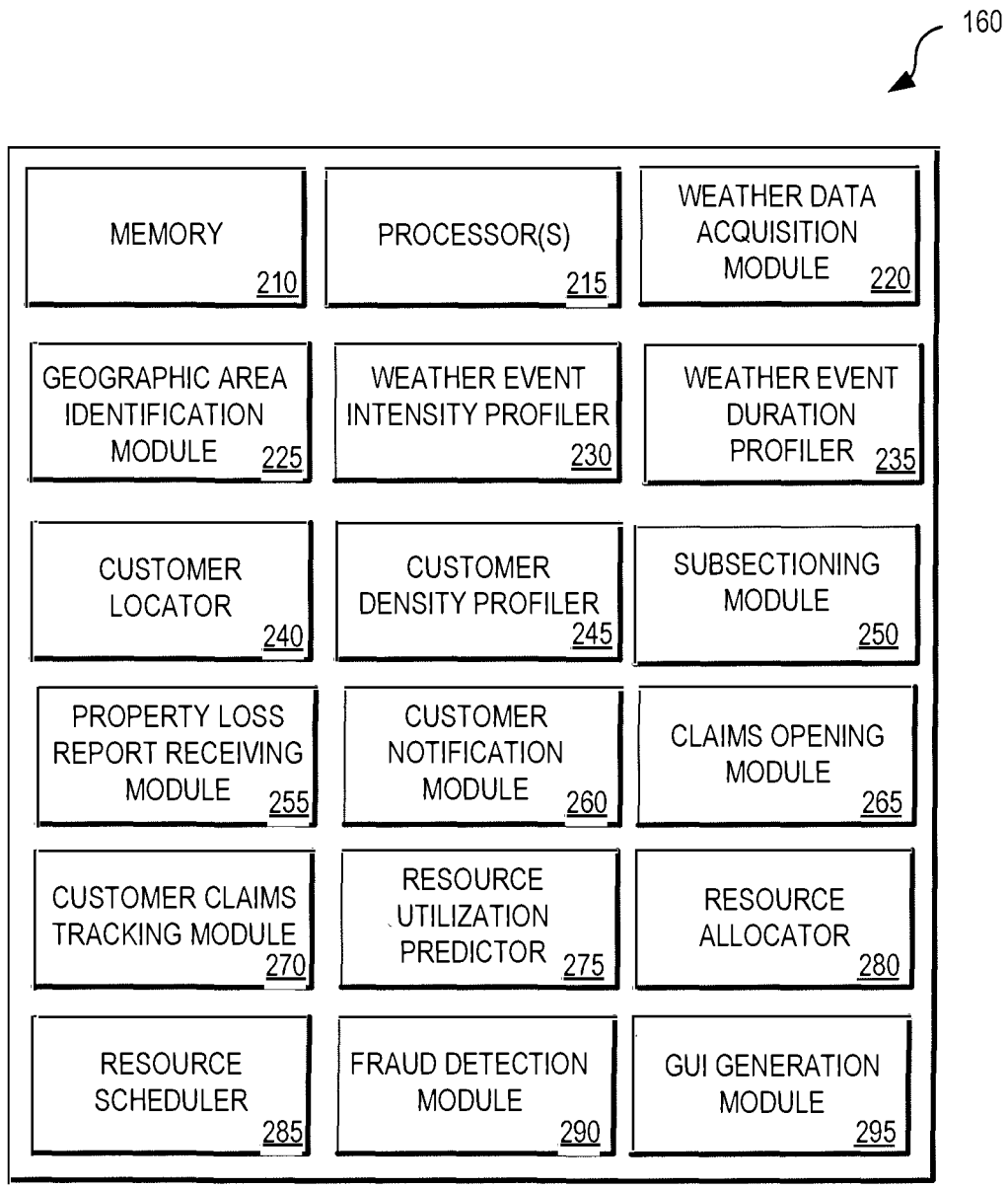
FIG. 2 is a block diagram illustrating exemplary components of an intelligent method of inspection system.

FIG. 2 is a block diagram illustrating components that can be included in a system such as catastrophic event manager 160. According to the embodiments shown in FIG. 2, memory 210, processor(s) 215, weather data acquisition module 220, geographic area identification module 225, weather event intensity profiler 230, weather event duration profiler 235, customer locator 240, customer density profiler 245, subsectioning module 250, property loss report receiving module 255, customer notification module 260, claims opening module 265, customer claims tracking module 270, resource utilization predictor 275, resource allocator 280, resource scheduler 285, fraud detection module 290, and Graphic User Interface (GUI) generation module 295. Other embodiments of the present disclosure may include some, all, or none of these modules and components along with other modules, applications, and/or components. The modules and components illustrated in FIG. 2 may be hardware, firmware, or software or a combination. Still yet, some embodiments may incorporate two or more of these modules into a single module and/or associate a portion of the functionality of one or more of these modules with a different module.

For example, in one embodiment, the functionality associated with weather event intensity profiler 230 and weather event duration profiler 235 can be incorporated into a weather event profiling module. In some embodiments, the subsectioning module 250 can be separated into an overlaying module to overlay insured property data with the weather data, and a subsectioning rules engine to apply the rules to the property and weather data to determine how to subdivide the geographic area.

Memory 210 can be any device, mechanism, or populated data structure used for storing information. In accordance with some embodiments of the present disclosure, memory 210 can encompass any type of, but is not limited to, volatile memory, nonvolatile memory and dynamic memory. For example, memory 210 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact discs, DVDs, and/or the like. In accordance with some embodiments, memory 210 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 210.

Memory 210 may be used to store instructions for running one or more applications or modules on processor(s) 215. For example, memory 210 could be used in one or more embodiments to house all or some of the instructions needed to execute the functionality of weather data acquisition module 220, geographic area identification module 225, weather event intensity profiler 230, weather event duration profiler 235, customer locator 240, customer density profiler 245, subsectioning module 250, property loss report receiving module 255, customer notification module 260, claims opening module 265, customer claims tracking module 270, resource utilization predictor 275, resource allocator 280, resource scheduler 285, fraud detection module 290, and GUI generation module 295.

Weather data acquisition module 220 can acquire weather data before, during, and/or after a catastrophic weather event such as a hail storm, a tornado, a hurricane, a wind storm, a cyclone, ice storm, etc. For purposes of this disclosure, catastrophic weather event may be any weather event that may cause losses to customers of an insurance provider. Weather data may include wind speeds, reports of hail, temperature, precipitation, duration, intensity, and other indications of the weather. In some embodiments, an alert system may be configured to alert an insurance provider that there is an incoming weather event that may cause property losses. When an alert is received, for example, the insurance provider may select a different level of weather information (e.g., from different services, different types of weather data, etc.) and/or collect reports from trusted sources (e.g., by sending an employee to the area).

Geographic area identification module 225 can identify a bounded geographical area affected by a weather event that potentially will cause or already has caused property losses to customers of an insurer. For example, an outline may be drawn on a map illustrating the geographical area where the weather event likely caused damage, such as the outline on the map shown in FIG. 8. The weather data and other information such as customer reports of damage and historical information relating to similar types of storms may be used in identifying this geographic area.

Figure 5:
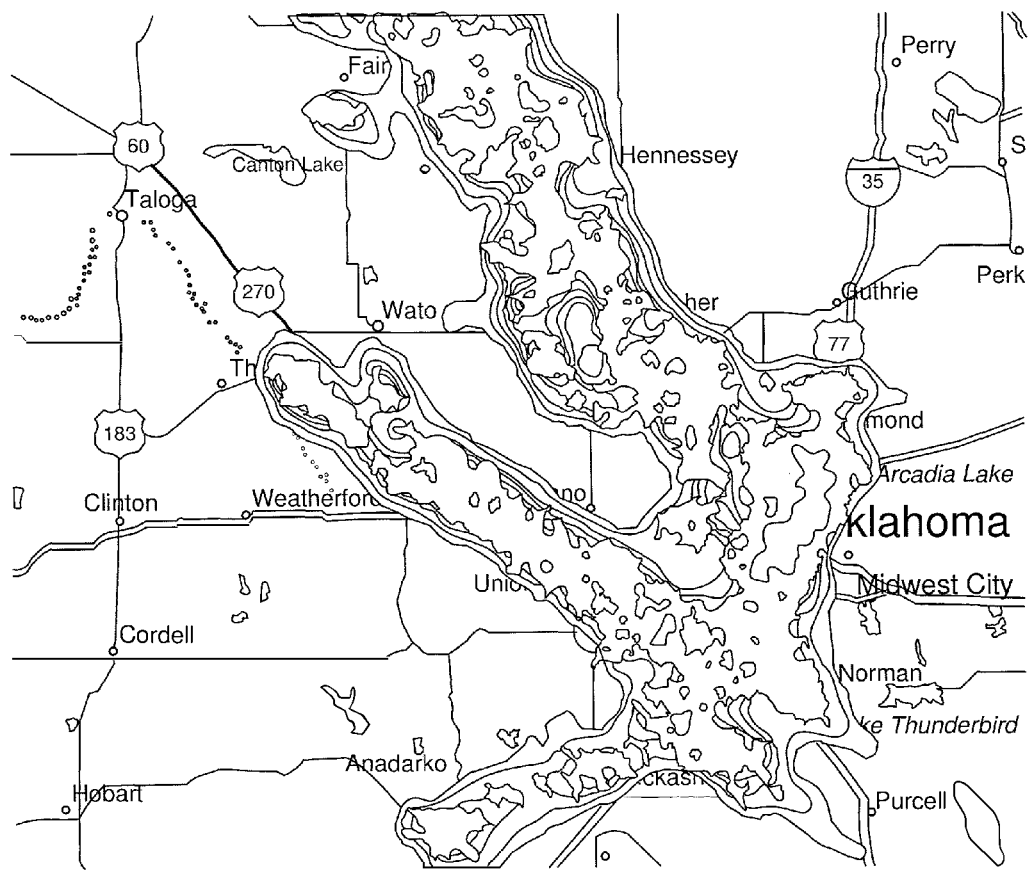
FIG. 5 illustrates an example of a weather event profile in accordance with one or more embodiments of the present disclosure.

Weather event intensity profiler 230 can generate a weather event intensity profile. The weather event intensity profile can include a visual image, graph, chart, colored map, or other indication of the intensity of a weather event in a geographical area. FIG. 5 is an example of one type of weather event intensity profile that may be generated and used. Different colors and shades on the illustration in FIG. 5 indicate varying levels of intensity of a weather event. In other cases, other representations such as gradient or numerical information representing the intensity profile may be generated by weather event intensity profiler 230. In addition, weather event intensity profiler 230 may generate multiple intensity profiles by combining information in different ways (e.g., with different weightings). Information from the weather event intensity profiler 230 may be collected from weather data acquisition module 220 and may be used in subsectioning module 250 to estimate the severity of damage and predict resource utilization.

Weather event duration profiler 235 can generate a weather event duration profile. The weather event duration profile may visually or otherwise illustrate the duration of the weather event in specific locations in the geographic area. The durations may be represented by varying colors, dotted lines, or other indication to show duration of the weather event in a particular geographical location. The weather event duration profile may be used to estimate property losses and predict resource utilization. For example, properties located in areas that sustained five hours of hurricane force winds likely sustained more damage than properties located in areas that sustained only fifteen minutes of the hurricane force winds.

Figure 6:
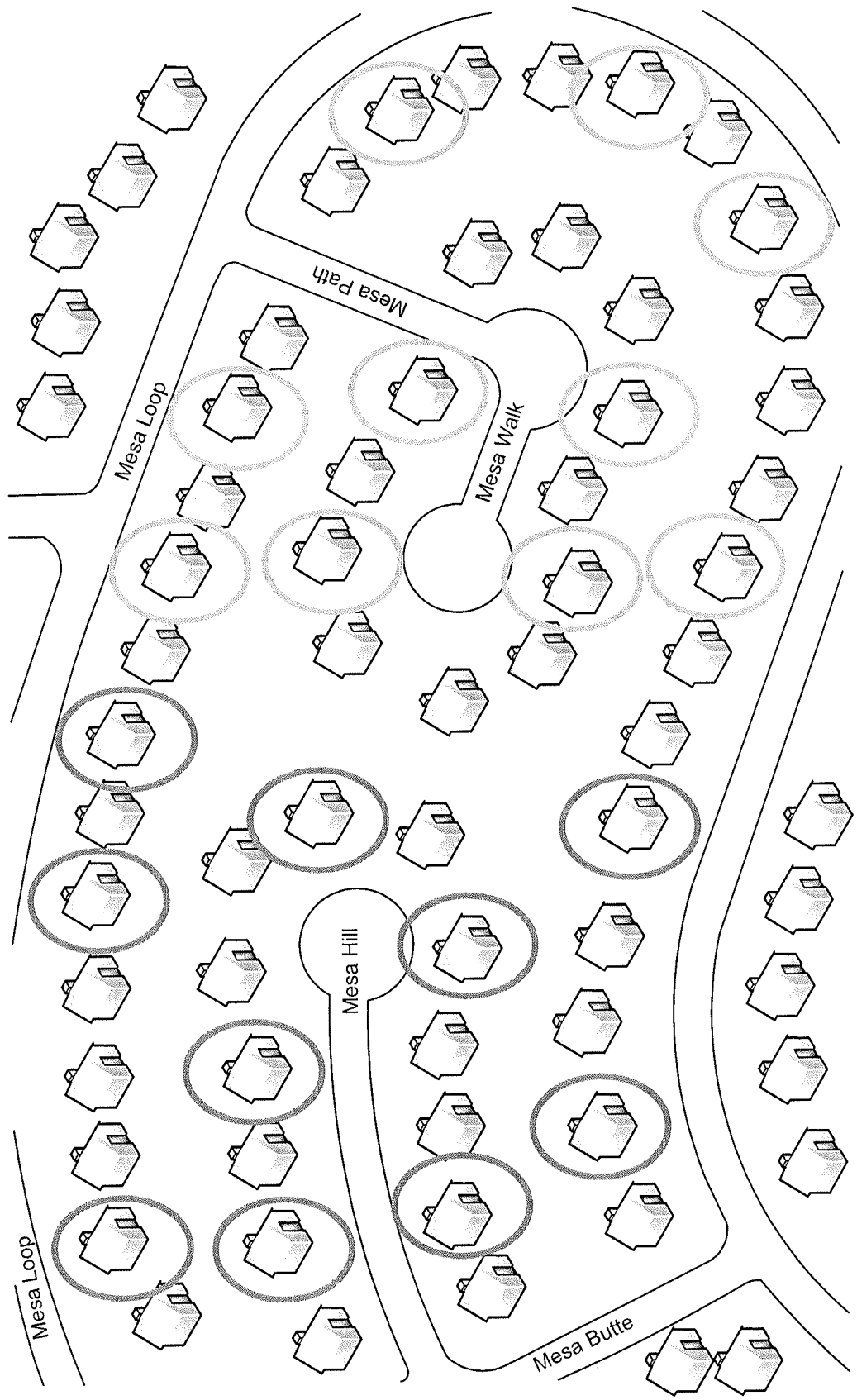
FIG. 6 illustrates an example of a customer density profile in accordance with one or more embodiments of the present disclosure.

Customer locator 240 can determine the location of the customers and insured properties of the customers within the bounded geographical area. Some customers may have more than one insured property in the area. The customer and property information may be collected from the customer database 150 and used by the customer density profiler 245 to generate a customer density profile. Determining a location of customers may include determining the Policies in Force (PIF). In some embodiments, the locations of the insured properties/customers/PIFs may be indicated on a map such as the map illustrated in FIG. 6. The circled properties in FIG. 6 represent the properties insured by the insurance companies.

Customer density profiler 245 can create a customer density profile of the bounded geographical area. A customer density profile may show the specific areas with the highest density of customers or PIFs and those with the lowest density of customers or PIFs. Customer density profile may be shown by overlaying the location of customers, insured properties or PIFs over a map of the geographical area and indicating each insured property or clusters of the insured properties. The customer density profile may be used by the subsectioning module 250 to divide the geographical area into subsections and further may be used to predict the amount of resources necessary or recommended for a given area.

Subsectioning module 250 may be configured to divide the bounded geographical area into subsections. The subsections may be based on one or more of the weather event intensity profile, the customer density profile, and the weather duration profile. Examples of subsections may be seen in FIGS. 7 and 8. In determining how the geographical area should be divided, subsectioning module 250 may overlay the customer location data with the weather data. In this way, the subsections can be divided based on severity of losses, number of customers, resources allocation concerns, etc. In some embodiments, a severity code can be assigned to one or more of the subsections indicating an estimated level of severity of the losses and/or corresponding assistance needed. These subsections and/or severity codes may be used when assigning resources to attend to the damage and/or ordering materials to resolve property losses.

Property loss report receiving module 255 may be configured to receive loss reports such as property and casualty loss reports from customers. In some embodiments, these loss reports may be used in the fraud detection module 290 to determine if a customer is fraudulently claiming damage. For example, the insurance company may review where the insured property is located in relationship to the weather intensity profile to determine if the claim should be labeled as suspicious.

Customer notification module 260 may be configured to notify customers of the impending or incurred losses. Customers may be notified using a variety of channels such as but not limited to email, SMS text, mobile push notifications, and telephone calls. In some embodiments, the weather data and customer location data is used in determining whether and/or how the customer should be notified. In some embodiments, neighborhoods of customers are notified; in other embodiments, entire subsections of customers are notified. In other embodiments, loss reports from others located nearby or within a predetermined distance are used in determining whether the customer should be notified. In this way, customers who have losses can begin the repair process early and potentially with a preferred provider of the insurance provider. In some embodiments the customer is notified prior to the weather event taking place. In other embodiments, the customer is notified after the weather event took place.

Claims opening module 265 can open property and casualty loss claims prior to the customer reporting the loss. The claims may be automatically opened based on the location of the insured property in relationship to the weather data such as the weather intensity profile and/or the weather duration profile. In some embodiments, claims may be opened prior to the damage being incurred, based on predictive weather data. In some embodiments, additional information such as loss reports received by nearby insured customers is used in determining claims that should be opened and their content. The customers may verify certain information at a later time, but opening claims early allows the insurance provider to proactively estimate costs, fill out the proper forms automatically, assign staff members to the claim, communicate with customers, reserve funds needed for repairs, and provide better service to customers. In some embodiments, claims that do not require inspection may be opened and resolved very quickly, using only automated processes.

Customer claims tracking module 270 can track claims opened by customers or the insurance provider, the status of those claims, which customers may have losses that have not yet been reported, and which customers have been notified of the possible damage. Using this information, the insurance provider may be better able to estimate costs. Moreover, this information may be used in determining which customers have yet to file a claim or be notified.

Resource utilization predictor 275 can predict resource utilization for each subsection based on estimated property losses in each subsection. The resource utilization predictor 275 may be further configured to estimate customer needs. For example, if a subsection or neighborhood has a high density of customers and the weather profile indicates that damage is likely severe in that subsection/neighborhood, the resource utilization predictor will predict that a higher amount of resources and additional types of resources will be necessary/recommended for that subsection/neighborhood as opposed to a subsection/neighborhood that has fewer customers or where damages estimated to be less severe. Resources may include hotel rooms, insurance adjustors, building materials, employees, inspectors, and contractors.

Resource prediction may be done prior to when the weather event takes place such that hotels can be reserved, insurance adjustors can be contacted, supplies may be ordered, inspections can be scheduled, customers may be notified, temporary employees may be hired, funds may be reserved, and other provisions may be made. Resource prediction may also be done after the weather event has occurred and may further be based on customer reports, media reports, actual weather data, and so on. In other cases, resource prediction may include a prediction made prior to the weather event and then updated over time based new information that is received.

Resource utilization predictor 275 can use a variety of methods, models, and/or rules in generating the resource predictions. For example, an adaptive model can be trained and/or created from historical weather and loss data. The rules may include business rules and regulatory rules (e.g., housing codes).

Resource allocator 280 can allocate resources to the various subsections and portions of subsections according to the predicted resource utilization. The allocation may be based on business rules, such as how many adjustors will be needed, the types of adjustors needed based on the adjustor's experience and the type of damage, current locations of adjustors in relation to the disaster, and a capacity of the adjustor for additional work.

Resource scheduler 285 can schedule resources. For example, the customer locator and the weather intensity profile shows that each insured person in a subsection or in a neighborhood or street will need new roofs, the resources scheduler 285 can bulk order the supplies, reserve the contractors, etc. In this way, the insurance provider can reduce costs by ordering in bulk, and picking preferred providers that have pre-negotiated rates with the insurance provider. The resource schedule 285 may assign claims in certain areas to claims specialists at the insurance provider.

Fraud detection module 290 may be configured to identify suspicious or fraudulent reports of losses. For example, the fraud detection module 290 may determine that a loss report is potentially fraudulent based on a location of the insured property and the weather intensity profile in the location of the insured property. Fraud detection module 290 may also leverage data from sensors, images, and reports from sightings in a social space. In an example, fraud detection module 290 may be used to detect that no hail event occurred on a particular street or in the general vicinity by determining that no customers reported hail in the area and weather data did not indicate hail occurring near the vicinity. Fraud detection module 290 may note that the claim is suspicious and provide a notification to an employee processing the claim. This may be particularly helpful in cases where roofing companies approach policyholders and urge policyholders to file a claim of hail damage.

In some embodiments, images are taken of insured properties in the geographical area prior to the weather event, and those images may be used to verify that the reported property losses were caused by the weather event. For example, a fraudulent report may be identified if a satellite image of a home shows that prior to the weather event, a roof appears to be in damaged, and after the weather event, the roof looks no different. In some embodiments, the images may be taken based on the predicted weather event.

GUI generation module 295 can generate one or more GUI screens that allow for interaction with a user. In at least one embodiment, GUI generation module 295 generates a graphical user interface allowing a user to report losses, track claims status, set preferences, and/or otherwise receive or convey information to the user.

Figure 3:
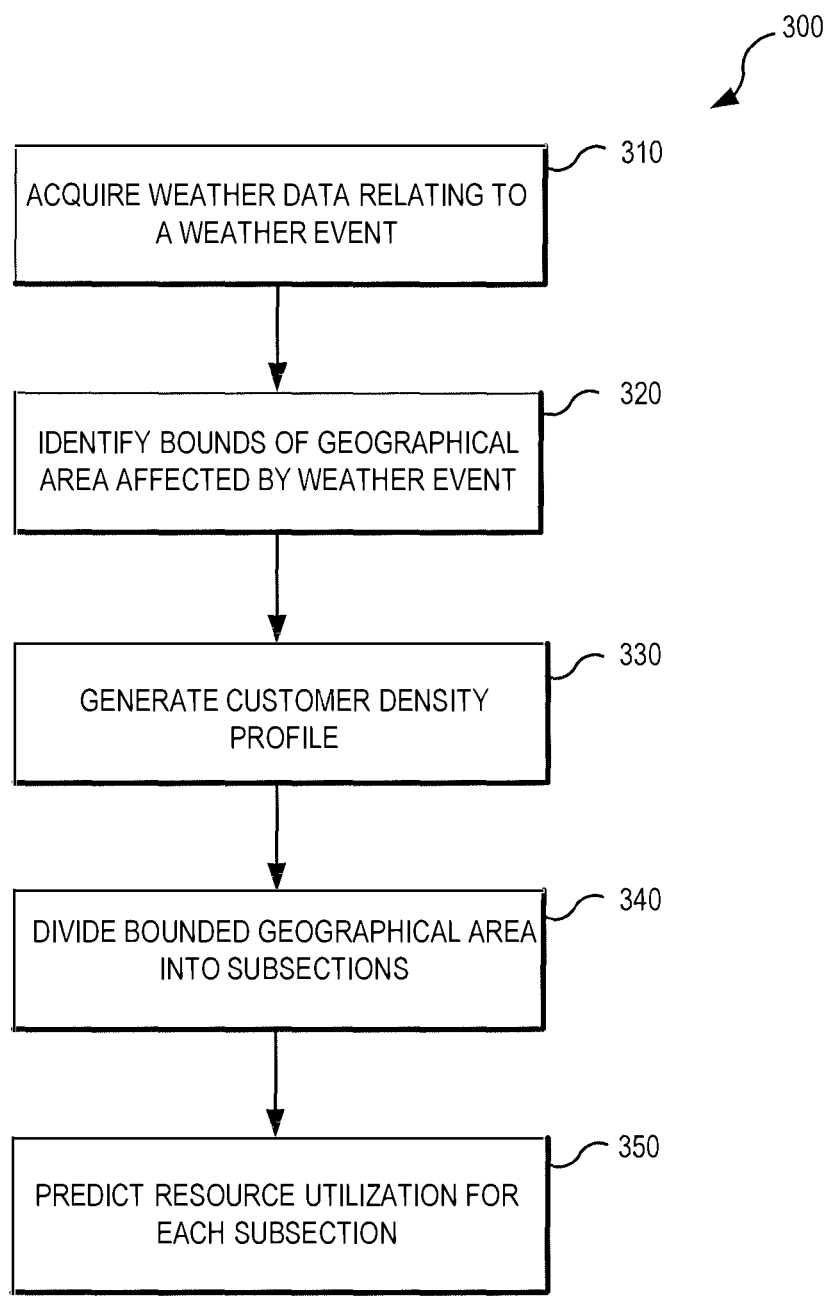
FIG. 3 is a flow chart illustrating a set of exemplary operations for performing an intelligent method of inspection in accordance with various embodiments of the present disclosure.

FIG. 3 is a flow chart illustrating a set of operations 300 for performing an intelligent method of inspection in accordance with various embodiments of the present disclosure. The operations can be performed by various components such as processor(s) 215, weather data acquisition module 220, geographic area identification module 225, weather event intensity profiler 230, weather event duration profiler 235, resource utilization predictor 275, resource allocator 280, resource scheduler 285, fraud detection module 290, and/or other modules or components.

As illustrated in FIG. 3, weather data acquisition operation 310 acquires weather data relating to a weather event that potentially caused or will cause losses to customers of an insurance provider. The weather data may be acquired in from one or more reporting services or feeds in batches, real-time, and/or near-real-time. The weather data may include a weather event intensity profile and/or weather event duration profile. Geographical area identification operation 320 identifies the bounds of the geographical area affected by the weather event. Generation operation 330 generates a customer density profile. Subsectioning operation 340 divides the bounded geographical area into subsections based on, for example, the customer density profile and the weather severity profile. Predicting operation 350 predicts a set of resources that may be used, such as the type of inspections, building materials, employees, etc. These resources may be allocated. For example, an employee may be assigned responsibility for all the claims in a particular subsection. The prediction may be per subsection or per neighborhood, street, etc.

Figure 4:
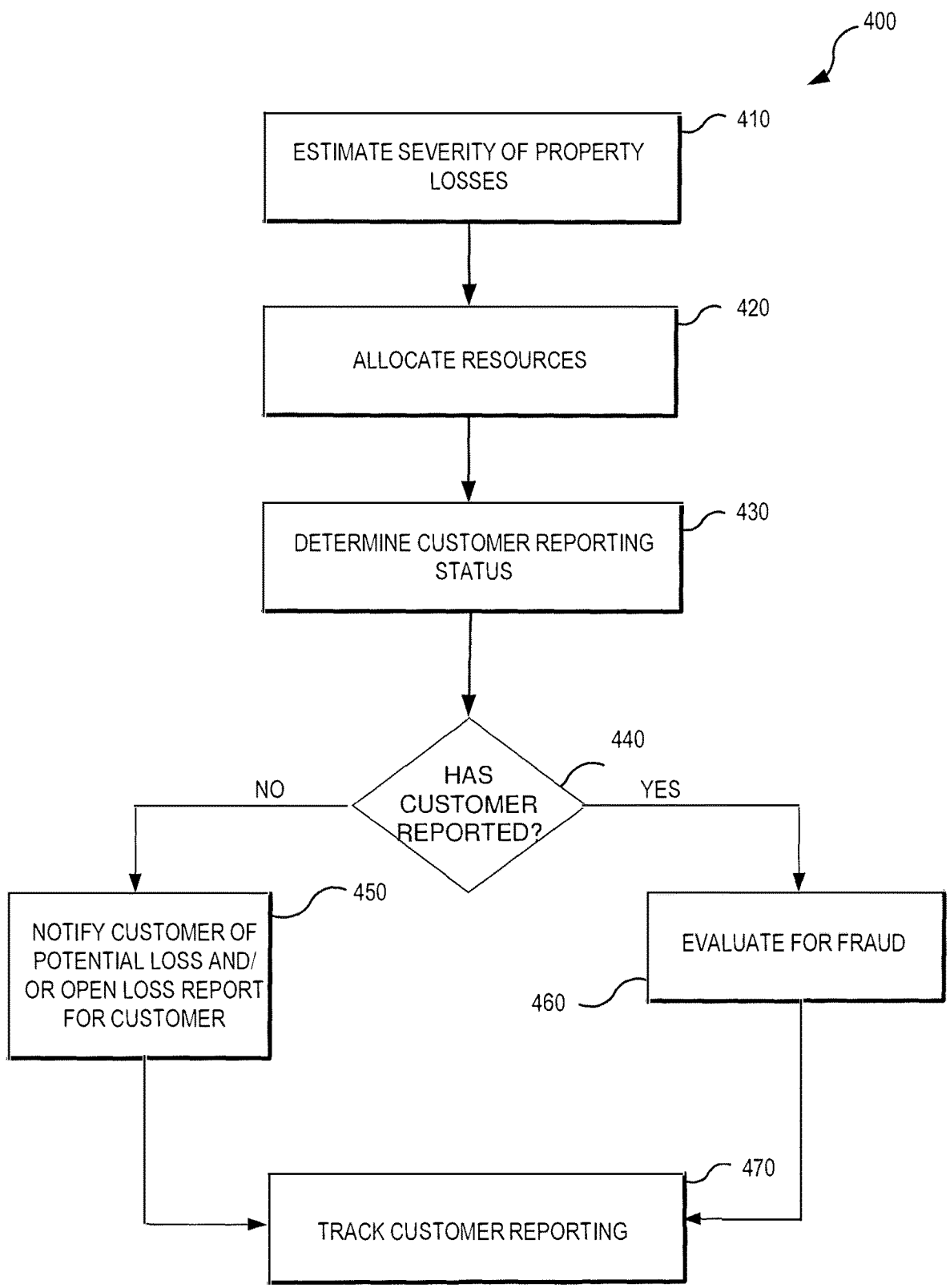
FIG. 4 is a flow chart illustrating a set of exemplary operations for performing an intelligent method of inspection in accordance with various embodiments of the present disclosure.

FIG. 4 is a flow chart illustrating a set of operations 400 for performing an intelligent method of inspection in accordance with various embodiments of the present disclosure. The operations can be performed by various components such as processor(s) 215, weather data acquisition module 220, geographic area identification module 225, weather event intensity profiler 230, weather event duration profiler 235, customer locator 240, customer density profiler 245, subsectioning module 250, property loss report receiving module 255, customer notification module 260, claims opening module 265, customer claims tracking module 270, resource utilization predictor 275, resource allocator 280, resource scheduler 285, fraud detection module 290, GUI generation module 295, or other components. In estimating operation 410, a severity of property losses are estimated. The estimations may be based on weather data, customer/property location data, and/or other data. Allocating operation 420 allocates resources to the bounded geographical area, such allocating resources to each of the subsections, neighborhoods or streets. The resources may include building supplies, insurance adjustors, and staff members. Determining reporting operation 430 determines which customers have reported property losses.

When determination operation 440 determines that a customer has reported a loss, the report may be evaluated for fraud using techniques described above in evaluating operation 460. When determination operation 440 determines that a customer in one of the affected subsections, neighborhoods, streets or other areas has not filed a property loss, the insurance provider may notify the customer of potential loss and/or open a loss report for the customer in notifying operation of 450. In some embodiments, an inspection may have been automatically scheduled and so the notifying may include notifying the customer of the scheduled inspection. Tracking operation 470 tracks the customers who have and have not reported, allowing the insurance provider to follow up with those customers who may have incurred losses but have yet to report the losses.

FIG. 5 illustrates an example of a weather event intensity profile in accordance with one or more embodiments of the present disclosure. The weather event intensity profile may include darker and lighter colors indicating the severity of the weather in a location.

FIG. 6 illustrates an example of a customer density profile in accordance with one or more embodiments of the present disclosure. Indicators may be used to indicate the expected level or assessed level of damage to the property. For example, the circles around the properties may be varying colors indicating the expected or assessed severity of damage. The colors may vary by neighborhood or by subsection for example. The visualization of the customer density profile illustrated in FIG. 6 may be part of a graphical user interface screen used by onsite adjustors. For example, as the adjustor moves around the neighborhood, a selection of one of the identified properties will automatically open up claim forms, questionnaires, note taking areas, or other feature for recording losses. This visualization may be used by staff employees of the insurance provider in assigning adjustors or contractors.

Figure 7:
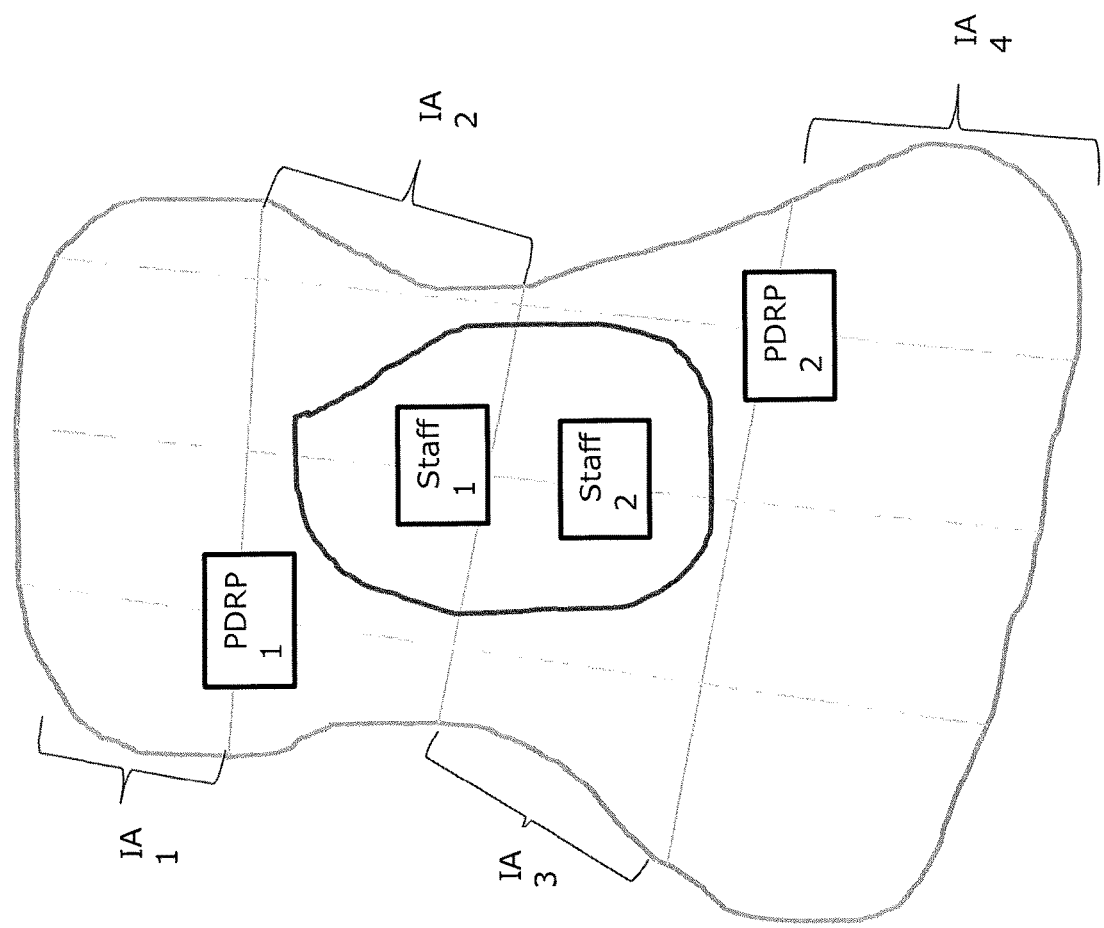
FIG. 7 illustrates an example of subsections within a bounded geographical area in accordance with one or more embodiments of the present disclosure.

FIG. 7 illustrates an example of subsections within a bounded geographical area in accordance with one or more embodiments of the present disclosure. Examples of how assignments may be divided are shown in FIG. 7. In some embodiments, adjusters or providers are associated with certain types of losses or characteristics of the types of losses the adjuster or provider can handle or has expertise in assessing. Then, after characteristics of the types of losses are determined, the adjustors and/or providers are assigned to losses based on the determined characteristics of the types of loss, matching the losses with the appropriately skilled adjustors.

In the example shown in FIG. 7, a geographical area affected by a weather event may be divided into portions (e.g., IA 1, IA 2, IA 3, and IA 4). In each portion, losses have occurred due to the weather event. In some embodiments, the portions may be quadrants. Based on the severity of the loss, weather information, information about the customer, etc., the losses will be assigned to the appropriate provider. In an example, every loss in one portion (e.g., IA 1) may be assigned to Adjustor 1 unless a loss (or loss within specific area of a portion) is assigned a higher and/or different severity code, in which case the loss is assigned to one or more different adjustors (e.g., Staff 1, Staff 2, PDRP 1, PDRP 2) based on the severity and type of damage and the expertise of the adjustors.

Figure 8:
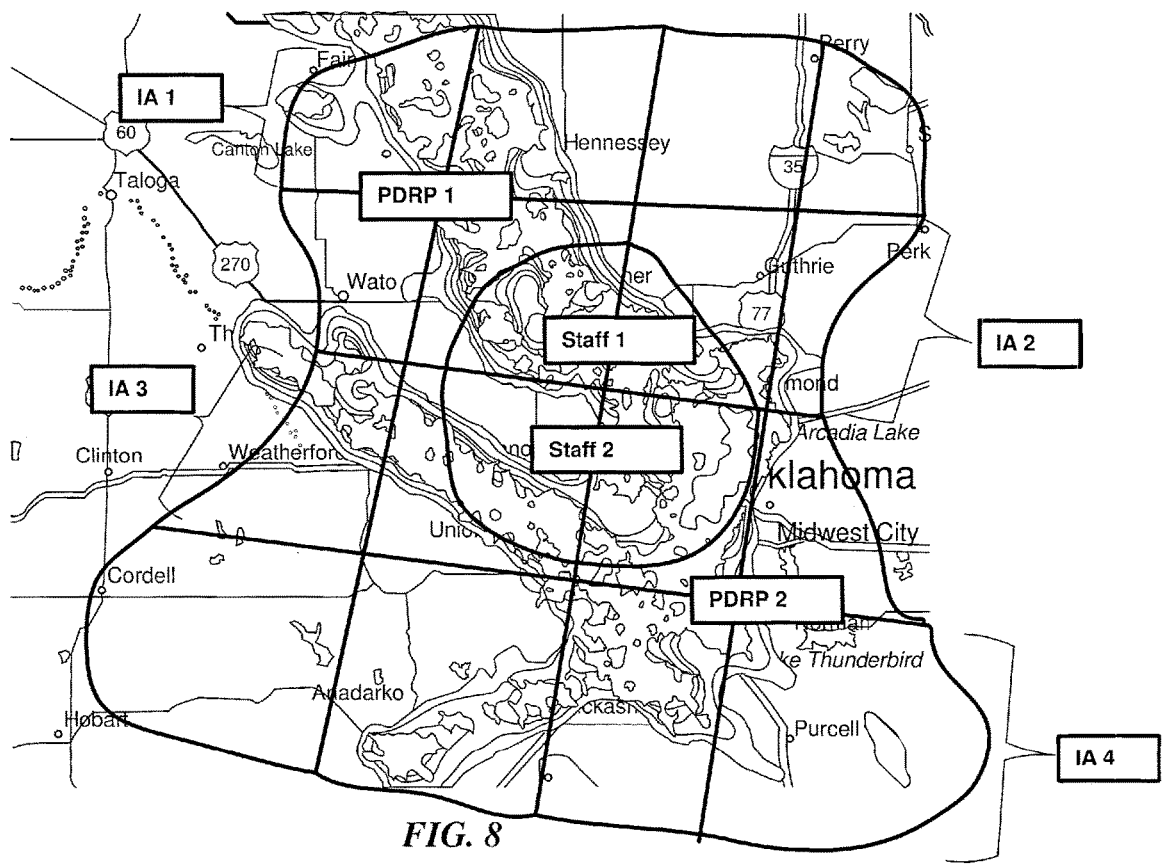
FIG. 8 illustrates an example of subsections within a bounded geographical area in accordance with one or more embodiments of the present disclosure.

In the example of FIG. 7, areas assessed with a severity code of 1 or 2 (most of the bounded geographical area) are assigned to independent adjustors. Areas assessed with a severity code of 3 or 4 are assigned to PDRP adjustors instead of the independent adjustors assigned to the portion or portions encompassing the area. Areas assessed with a severity code of 5 or 6 are assigned to staff adjustors instead of the independent adjustors assigned to those portions. FIG. 8 illustrates an example of the subsections discussed in FIG. 7 overlaid with weather data. The subsections include various assignments for resources based on the severity of the weather, estimated damages, etc. as discussed in FIG. 7.

Computer System Overview

Figure 9:
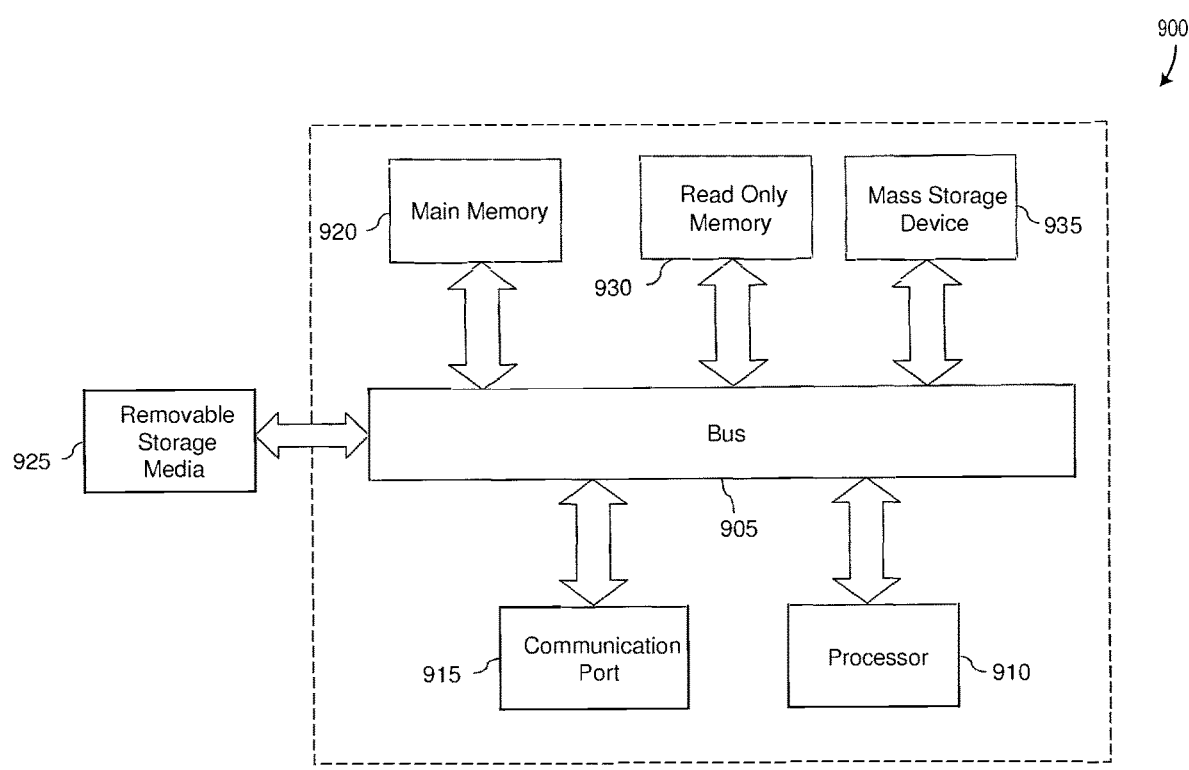
FIG. 9 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 9 is an example of a computer system 900 with which embodiments of the present disclosure may be utilized. According to the present example, the computer system includes a bus 905, at least one processor 910, at least one communication port 915, a main memory 920, a removable storage media 925, a read only memory 930, and a mass storage 935.

Processor(s) 910 can be any known processor, such as, but not limited to, an Intel® Itanium® or Itanium 2® processor(s), or AMD® Opteron® or Athlon MP® processor(s), or Motorola® lines of processors. Communication port(s) 915 can be any of an RS-232 port for use with a modem based dialup connection, a 10/100 Ethernet port, or a Gigabit port using copper or fiber. Communication port(s) 915 may be chosen depending on a network such a Local Area Network (LAN), Wide Area Network (WAN), or any network to which the computer system 900 connects.

Main memory 920 can be Random Access Memory (RAM), or any other dynamic storage device(s) commonly known in the art. Read only memory 930 can be any static storage device(s) such as Programmable Read Only Memory (PROM) chips for storing static information such as instructions for processor 910.

Mass storage 935 can be used to store information and instructions. For example, hard disks such as the Adaptec® family of SCSI drives, an optical disc, an array of disks such as RAID, such as the Adaptec family of RAID drives, or any other mass storage devices may be used.

Bus 905 communicatively couples processor(s) 910 with the other memory, storage and communication blocks. Bus 905 can be a PCI/PCI-X or SCSI based system bus depending on the storage devices used.

Removable storage media 925 can be any kind of external hard-drives, floppy drives, IOMEGA® Zip Drives, Compact Disc—Read Only Memory (CD-ROM), Compact Disc—Re-Writable (CD-RW), Digital Video Disc—Read Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Embodiments of the present disclosure may be provided as a computer program product which may include a machine-readable medium having stored thereon instructions which may be used to program a computer (or other electronic devices) to perform a process. The machine-readable medium may include, but is not limited to, floppy diskettes, optical discs, compact disc read-only memories (CD-ROMs), and magneto-optical discs, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present disclosure may also be downloaded as a computer program product, wherein the program may be transferred from a remote computer to a requesting computer by way of data signals embodied in a carrier wave or other propagation medium via a communication link (e.g., a modem or network connection).

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods and arrangements for intelligent methods of inspection. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A method comprising:
    identifying, by a processor associated with a computer system, a bounded geographical area affected by a weather event, the weather event having a weather event intensity profile;
    generating, by the processor associated with the computer system, a customer density profile in the bounded geographical area;
    collecting sensor data from one or more sensors located in the bounded geographical area;
    assigning a severity code indicating an estimated level of severity of property losses based on the collected sensor data, the weather event intensity profile, and the customer density profile, wherein the sensor data is indicative of a propensity of the weather event;
    predicting resource utilization at least based on the severity code;
    generating one or more loss reports of selected one or more insured properties for selected customers; and
    facilitating the resource utilization based on the one or more loss reports.

2. The method of claim 1, further comprising:
    recommending a level and a type of resources based on the resource utilization.

3. The method of claim 1, further comprising:
    estimating a customer need based on at least one of the customer density profile and the weather event intensity profile.

4. The method of claim 1, further comprising:
    receiving customer-generated loss reports from one or more of the selected customers, wherein predicting the resource utilization is further based on the received customer-generated loss reports.

5. The method of claim 1, further comprising:
    acquiring weather data prior to occurrence of the weather event,
    wherein the weather event intensity profile is generated from the weather data acquired prior to the occurrence of the weather event,
    wherein the weather data indicates a potential property loss by the weather event to a customer of an insurer.

6. The method of claim 1, wherein the one or more loss reports are generated based on weather intensity profiles in locations of the selected one or more insured properties for the selected customers.

7. The method of claim 1, further comprising:
    after the weather event, verifying that reported property losses were caused by the weather event using images taken prior to the weather event.

8. The method of claim 1, further comprising:
    receiving a customer-generated loss report for an insured property of one of the selected customers; and
    determining that the customer-generated loss report is fraudulent based on a location of the insured property and at least one weather intensity profile.

9. The method of claim 1, further comprising:
    notifying customers of potential property losses based on locations of the one or more insured properties of the customers in relation to the weather event intensity profile.

10. The method of claim 1, wherein resources include at least one of the following: insurance adjustors, hotel rooms, roofing contractors, building materials, or insurer's employees.

11. The method of claim 1, wherein resources include insurance adjustors, and wherein the method further comprises:
    assigning sections or portions of sections to the insurance adjustors for inspection, wherein inspection includes inspecting insured properties in the sections or the portions of the sections according to the predicted resource utilization.

12. The method of claim 1, further comprising:
    scheduling resources to proactively assist potentially affected customers with resolving property losses.

13. The method of claim 1, wherein the resources are associated with a preferred provider of an insurer.

14. A system comprising:
    one or more processors; and
    one or more memories storing instructions that, when executed by the one or more processors, cause the system to perform a method comprising:
        identifying, by a processor associated with a computer system, a bounded geographical area affected by a weather event, the weather event having a weather event intensity profile;
        generating, by the processor associated with the computer system, a customer density profile in the bounded geographical area
        collecting sensor data from one or more sensors located in the bounded geographical area;
        assigning a severity code indicating an estimated level of severity of property losses based on the collected sensor data, the weather event intensity profile, and the customer density profile, wherein the sensor data is indicative of a propensity of the weather event;

predicting resource utilization at least based on the severity code;

generating one or more loss reports of selected one or more insured properties for selected customers; and facilitating the resource utilization based on the one or more loss reports.

15. The system of claim 14, further comprising:

receiving customer-generated loss reports from one or more of the selected customers, wherein predicting the resource utilization is further based on the received customer-generated loss reports.

16. A non-transitory computer-readable medium having computer-readable instructions for programming a computer, the computer-readable instructions comprising instructions which, when executed by a processor, perform a method:

identifying, by a processor associated with a computer system, a bounded geographical area affected by a weather event, the weather event having a weather event intensity profile;

generating, by the processor associated with the computer system, a customer density profile in the bounded geographical area;

collecting sensor data from one or more sensors located in the bounded geographical area;

assigning a severity code indicating an estimated level of severity of property losses based on the collected sensor data, the weather event intensity profile, and the customer density profile, wherein the sensor data is indicative of a propensity of the weather event;

predicting resource utilization at least based on the severity code;

generating one or more loss reports of selected one or more insured properties for selected customers; and facilitating the resource utilization based on the one or more loss reports.

17. The non-transitory computer-readable medium of claim 16, wherein the method further comprises:

recommending a level and a type of the resource utilization.

18. The non-transitory computer-readable medium of claim 16, wherein predicting the resource utilization comprises:

estimating a customer need based on the customer density profile and the weather event intensity profile.

19. The non-transitory computer-readable medium of claim 16, wherein the method further comprises:

receiving customer-generated loss reports from one or more of the selected customers, wherein the resource utilization is predicted based on the received customer-generated loss reports.

20. The non-transitory computer-readable medium of claim 16, wherein the method further comprises:

acquiring weather data prior to occurrence of the weather event, wherein the weather event intensity profile is generated from the weather data acquired prior to the occurrence of the weather event.

* * * * *